United States Patent [19]
Wanat et al.

[11] Patent Number: 6,009,862
[45] Date of Patent: Jan. 4, 2000

[54] EXHAUST GAS RECIRCULATION CONTROL SYSTEM AND METHOD

[75] Inventors: Richard Louis Wanat, Southfield; Joseph Norman Ulrey, Plymouth, both of Mich.; Jonathan Willey, Purleigh Essex, United Kingdom; Keith Zwyghuizen Doorenbos, Dearborn, Mich.

[73] Assignee: Ford Global Technologies, Inc., Dearborn, Mich.

[21] Appl. No.: 09/129,521

[22] Filed: Aug. 5, 1998

[51] Int. Cl.[7] .................................................. F02M 25/07
[52] U.S. Cl. ................................. 123/568.22; 123/568.21
[58] Field of Search ..................... 123/568.16, 568.21, 123/568.22, 568.23, 568.24, 568.26

[56] References Cited

U.S. PATENT DOCUMENTS

| | | | |
|---|---|---|---|
| 4,433,666 | 2/1984 | Masaki et al. | 123/568.22 |
| 4,466,415 | 8/1984 | Piesche | 123/568.3 |
| 4,474,008 | 10/1984 | Sakurai et al. | 60/605.2 |
| 4,598,684 | 7/1986 | Kato et al. | 123/568.22 |
| 4,736,728 | 4/1988 | Takahashi et al. | 123/568.27 |
| 5,113,835 | 5/1992 | Seki et al. | 123/568.21 |
| 5,190,017 | 3/1993 | Cullen et al. | 123/676 |
| 5,448,974 | 9/1995 | Toda | 123/400 |
| 5,515,833 | 5/1996 | Cullen et al. | 123/568.22 |
| 5,533,489 | 7/1996 | Socci et al. | 123/568.21 |
| 5,724,950 | 3/1998 | Shino et al. | 123/568.21 |
| 5,758,309 | 5/1998 | Satoh | 123/568.26 |
| 5,889,203 | 3/1999 | Wild et al. | 123/568.21 |

*Primary Examiner*—Willis R. Wolfe
*Attorney, Agent, or Firm*—Jerome R. Drouillard

[57] ABSTRACT

A system and method for controlling exhaust gas recirculation flow of an internal combustion engine uses a feedforward estimate based on throttle position in addition to a feedback term based on a measured pressure differential across an orifice indicative of flow. The throttle position acts as a as a leading signal thus compensating for inherent delays in the exhaust gas recirculation flow control system.

13 Claims, 2 Drawing Sheets

EXHAUST GAS RECIRCULATION CONTROL SYSTEM AND METHOD

FIELD OF THE INVENTION

The present invention relates to an exhaust gas recirculation (EGR) control system for an internal combustion engine where a differential pressure flow signal and throttle position signal are used.

BACKGROUND OF THE INVENTION

Engine control systems require accurate control of exhaust gas recirculation (EGR) for controlling regulated emissions and achieving fuel economy improvements. One type of exhaust gas recirculation system externally recirculates the exhaust gas from the exhaust manifold to the intake manifold with a controllable valve placed in the flow path between the exhaust manifold and the intake manifold. Typically, the valve is pneumatically operated and controlled by an electronic engine controller.

One approach to controlling the valve is to create a signal based on a throttle position. In such a system, the throttle position is used as an input to two parallel filters. The first filter acts as a differentiator and the second filter acts as a fixed-rate tracking filter. As a result, the differentiation filter mostly controls turning the valve off, while the second filter mostly determines the time period for keeping the valve off, or closed. Such a system is described in U.S. Pat. No. 5,533,489.

Another approach to controlling exhaust gas recirculation flow is to use a feedback variable to assure that the actual exhaust gas recirculation flow converges to the desired exhaust gas recirculation flow. One method is to use a differential pressure measured across an orifice in the exhaust flow path. Then, the differential pressure can be used to infer the actual exhaust gas recirculation flow. Finally, an error between the actual and desire exhaust gas recirculation flow is used to create a control signal that is sent to the actuator. Thus, the system can compensate for the effects of engine and component aging, as well as other errors in the system. Such a system is disclosed in U.S. Pat. No. 5,190,017.

The inventors herein have recognized several disadvantages with the above systems. For example, the throttle position filters described above are for controlling a valve that is simply on or off. Also, the differentiation filter does not discriminate between opening and closing throttle position. This is an important characteristic because most exhaust gas recirculation valves have asymmetric behavior. Typically, the valve will close much faster than it opens.

SUMMARY OF THE INVENTION

An object of the invention claimed herein is to provide a method to more accurately control exhaust gas recirculation in an internal combustion engine.

The above object is achieved, and disadvantages of prior approaches overcome, by a method for controlling exhaust gas recirculation in an internal combustion engine having a throttle, an exhaust gas recirculation control valve, and a differential pressure measured across an orifice. The method comprises sensing a differential pressure across an orifice, said differential pressure indicative of an exhaust gas recirculation flow, sensing a throttle position of the throttle, filtering said throttle position with a first low pass filter when said throttle position is opening and filtering said throttle position with a second low pass filter when said throttle position is closing, generating a desired exhaust gas recirculation flow based on an engine load, an engine speed, and atmospheric pressure, creating an error signal from a difference between said sensed exhaust gas recirculation flow and said desired exhaust gas recirculation flow, creating an actuation signal for the exhaust gas recirculation control valve based on said error, and generating an adjusted actuation signal by adding a function of said filtered throttle position and said atmospheric pressure to said actuation signal.

By using feedback control in combination with a feedforward adjustment based on throttle position, where both magnitude and direction of throttle position change are used, the exhaust gas recirculation control system is able to begin taking the right amount of action to adjust the position of the exhaust gas recirculation valve before engine operating conditions change. In other words, the throttle position is used as a leading indicator to future engine operating conditions. Then, because of the inherent delays in the exhaust gas recirculation system, when the exhaust gas recirculation valve does change position, it will be at substantially the same instant as when engine operating conditions actually change. Thus, the actual amount of exhaust gas recirculation delivered to the engine will more closely match the desired amount of exhaust gas recirculation, even during large transients in engine operating conditions. Then, any error in the feedforward calculations can be compensated for by the measurement of actual exhaust gas recirculation.

An advantage of the above aspect of the invention is improved emission control.

Another advantage of the above aspect of the invention is improved fuel economy.

Other objects, features and advantages of the present invention will be readily appreciated by the reader of this specification.

BRIEF DESCRIPTION OF THE DRAWINGS

The object and advantages described herein will be more fully understood by reading an example of an embodiment in which the invention is used to advantage, referred to herein as the Description of the Preferred Embodiment, with reference to the drawings wherein.

BRIEF DESCRIPTION OF THE PREFERRED EMBODIMENT

Figure 1:
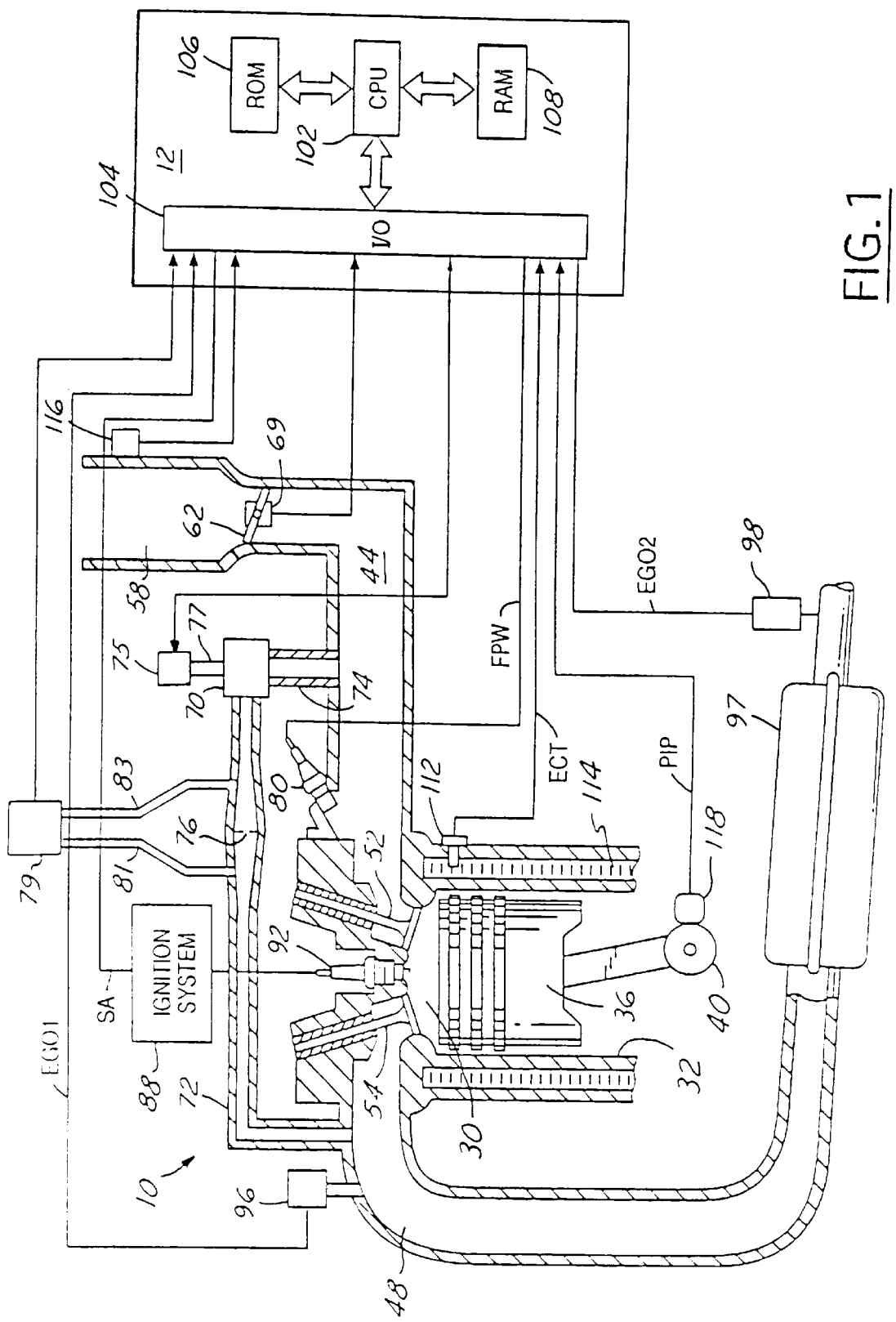
FIG. 1 is a block diagram of an engine in which the invention is used to advantage.

Internal combustion engine 10 comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold and exhaust manifold 48 via respective intake valve 52 and exhaust valve 54. Intake manifold 44 is shown communicating with throttle body 58 via throttle plate 62. Throttle position sensor 69 measures position of throttle plate 62. Exhaust manifold 48 is shown coupled to exhaust gas recirculation valve 70 via exhaust gas recirculation tube 72. Exhaust gas recirculation valve 70 is also coupled to intake manifold 44 via tube 74. Exhaust gas recirculation valve 70, which in this example is a pneumatic vacuum controlled valve, is also coupled to electronically controlled vacuum regulator 75 via vacuum tube 77. Exhaust gas recirculation tube 72 has orifice 76 for restricting flow therein. In addition, tube 72 is also coupled to differential pressure sensor 79 via tubes 81 and 83. Tube 81 is located upstream of orifice 76 while tube 83 is located downstream of orifice 76.

Intake manifold 44 is also shown having fuel injector 80 coupled thereto for delivering liquid fuel in proportion to the pulse width of signal FPW from controller 12. Fuel is delivered to fuel injector 80 by a conventional fuel system (not shown) including a fuel tank, fuel pump, and fuel rail (not shown). Alternatively, the engine may be configured such that the fuel is injected directly into the cylinder of the engine, which is known to those skilled in the art as a direct injection engine.

Conventional distributorless ignition system 88 provides ignition spark to combustion chamber 30 via spark plug 92 in response to controller 12. Two-state exhaust gas oxygen sensor 96 is shown coupled to exhaust manifold 48 upstream of catalytic converter 97. Two-state exhaust gas oxygen sensor 98 is shown coupled to exhaust manifold 48 downstream of catalytic converter 97. Sensor 96 provides signal EGO1 to controller 12 which converts signal EGO1 into two-state signal EGO1S. A high voltage state of signal EGO1S indicates exhaust gases are rich of a reference air/fuel ratio and a low voltage state of converted signal EGO1 indicates exhaust gases are lean of the reference air/fuel ratio. Sensor 98 provides signal EGO2 to controller 12 which converts signal EGO2 into two-state signal EGO2S. A high voltage state of signal EGO2S indicates exhaust gases are rich of a reference air/fuel ratio and a low voltage state of converted signal EGO2S indicates exhaust gases are lean of the reference air/fuel ratio.

Controller 12 is shown in FIG. 1 as a conventional microcomputer including: microprocessor unit 102, input/output ports 104, read only memory 106, random access memory 108, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a measurement of mass air flow (MAF) from mass air flow sensor 116 coupled to throttle body 58; and a profile ignition pickup signal (PIP) from Hall effect sensor 118 coupled to crankshaft 40.

In addition controller 12 sends a control signal to vacuum regulator 75, which in turn controls a vacuum sent to control the position of exhaust gas recirculation valve 70. Controller 12 also receives a signal from differential pressure sensor 79 indicative of an exhaust gas recirculation flow through orifice 76 based on the pressure measured through tubes 81 and 83.

Figure 2:
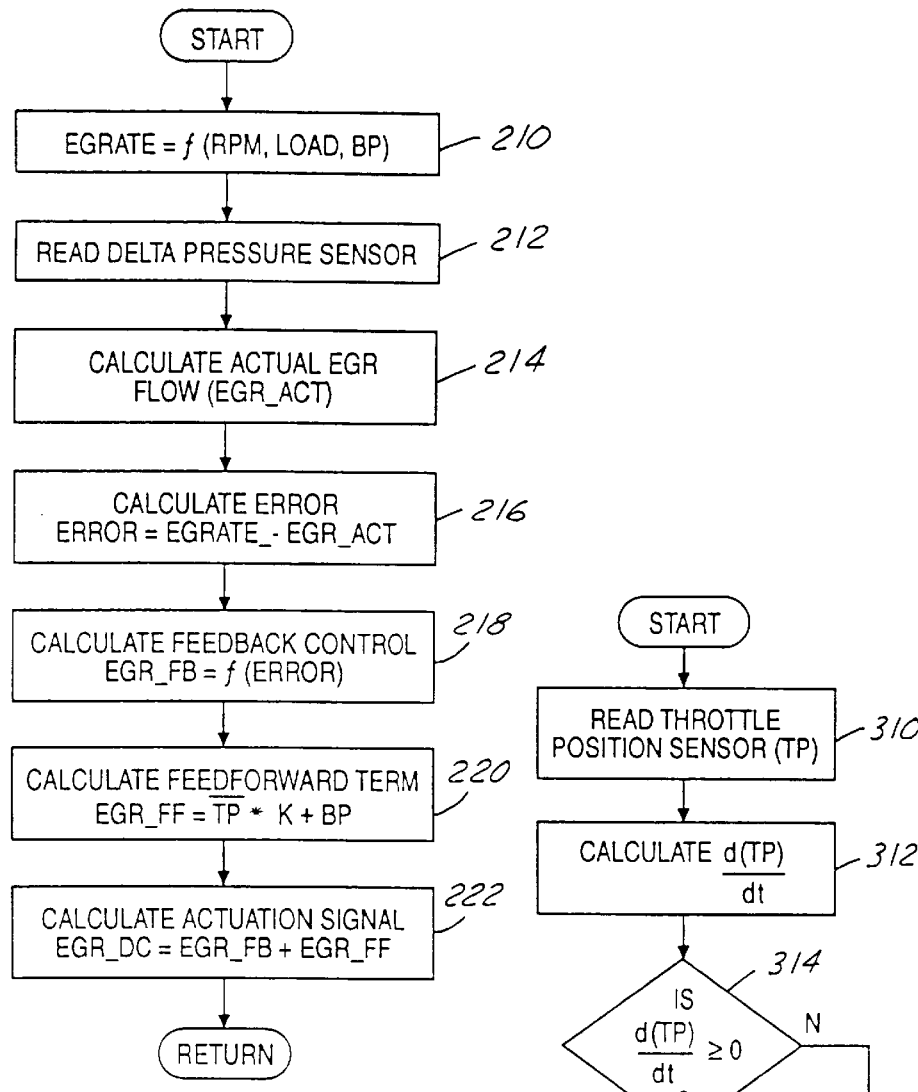
FIGS. 2–3 are high level flowcharts of various operations performed by a portion of the embodiment shown in FIG. 1.

Referring now to FIG. 2, a flowchart of a routine performed by controller 12 to generate an exhaust gas recirculation valve actuation signal. In step 210, the desired exhaust gas recirculation flow (EGRATE), which is expressed as a percentage of total flow entering the engine, is calculated as a function of engine speed (RPM), load, and barometric (or atmospheric) pressure (BP) as described in U.S. Pat. No. 5,515,833, which is incorporated herein by reference. Then, in step 212, differential pressure sensor 79 is read. Then, in step 214, the differential pressure measurement is converted using a calibration table to an actual exhaust gas recirculation flow (EGR_ACT). The calibration table is based on the empirical relationship between the pressure drop across an orifice to the mass of gas flowing through the orifice, as is known to those skilled in the art. In addition, the calibration table may take into account other factors, such as, for example, an exhaust gas temperature as measured by an exhaust gas temperature sensor or an exhaust gas temperature model, and other parameters known to those skilled in the art and suggested by this disclosure.

Continuing with FIG. 2, in step 216 a control error (ERROR) is calculated by subtracting the actual exhaust gas recirculation flow (EGR_ACT) from the desired exhaust gas recirculation flow (EGRATE). Then, in step 218, a feedback term (EGR_FB) is calculated based on the signal ERROR. In a preferred embodiment, this function is a controller known to those skilled in the arts as a lead lag compensator. However, any controller may be used, such as, for example, a proportional plus integral controller. Then, in step 220, a feedforward term (EGR_FF) is calculated as a function of a filtered throttle position ($\overline{TP}$), which is described later herein with particular reference to FIG. 3, atmospheric pressure (BP), and a gain factor (K). In another embodiment, gain factor (K) may be a function of filtered throttle position ($\overline{TP}$). Then, in step 222, actuation signal EGR_DC, which is sent to vacuum regulator 75, is calculated as the sum of signals EGR_FB and EGR_FF.

Figure 3:
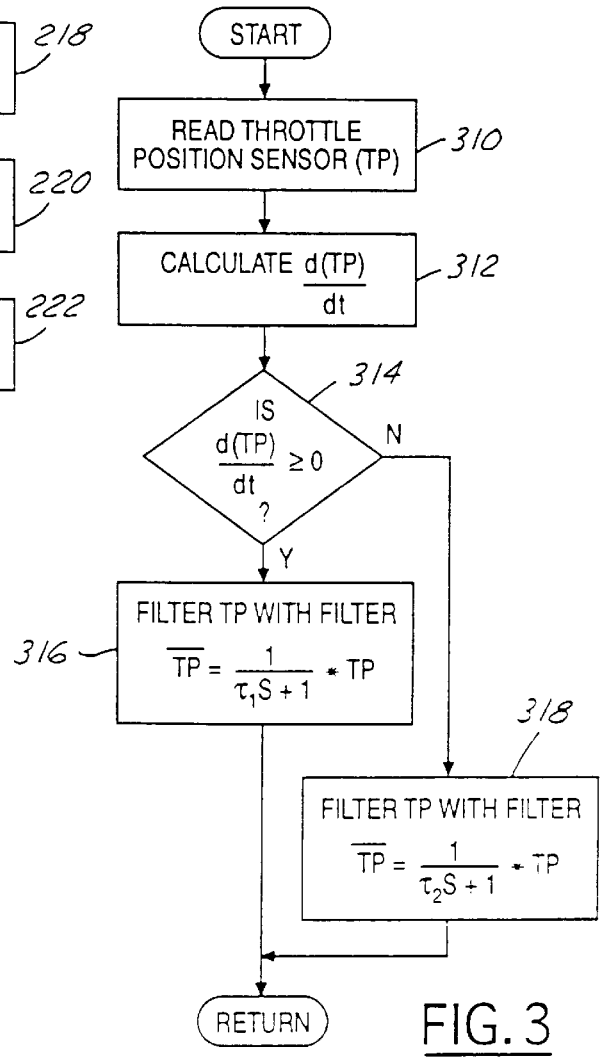

Referring now to FIG. 3, the routine for generating filtered throttle position ($\overline{TP}$) is described. In step 310, throttle position sensor 69 is read to create signal TP. Then, in step 312, the change in signal TP is calculated to determine if throttle plate 62 is opening or closing using the derivative $$\left(\frac{d(TP)}{dt}\right).$$

Then, in step 314, a determination is made as to whether the derivative is increasing or decreasing. When increasing, signal TP is filtered in step 316 to create signal $\overline{TP}$ with a first order low pass filter having time constant ($\tau_1$), where the first order filter has the form know to those skilled in the arts as $$\left(\frac{1}{\tau_1 s + 1}\right).$$

However, when decreasing, signal TP is filtered in step 318 to create signal $\overline{TP}$ with a first order low pass filter having time constant ($\tau_2$), where the first order filter has the form know to those skilled in the arts as $$\left(\frac{1}{\tau_2 s + 1}\right).$$

In a preferred embodiment, time constant $\tau_1$ is higher than time constant $\tau_2$. In other words, the low pass filter with $\tau_1$ has a lower cut-off frequency than the low pass filter with $\tau_2$. In addition, any other filter known to those skilled in the art that allows the signal to have a higher bandwidth when decreasing than increasing may be used in place of the filters shown.

While the best mode for carrying out the invention has been described in detail, those skilled in the art in which this invention relates will recognize various alternative designs and embodiments, including those mentioned above, in practicing the invention that has been defined by the following claims.

What is claimed is:

1. An exhaust gas recirculation control system for an internal combustion engine having an intake manifold and exhaust manifold, the system comprising:
   a throttle located in the intake manifold of the engine;
   a pneumatic exhaust gas recirculation tube coupled between the intake manifold and exhaust manifold of the engine;
   an electronically controlled vacuum regulator for controlling a valve position of said pneumatic exhaust gas recirculation control valve by converting an electrical signal into a vacuum;
   an exhaust gas recirculation control valve located in said tube;
   an orifice located in said tube upstream of said exhaust gas recirculation control valve;
   a differential pressure sensor for measuring a differential pressure across said orifice indicative of an exhaust gas recirculation flow; and
   an electronic engine controller for reading said differential pressure sensor, filtering said read differential pressure sensor with a first low pass filter, sensing a throttle position of the throttle, filtering said throttle position with a second low pass filter when said throttle position is opening and filtering said throttle position with a third low pass filter when said throttle position is closing, with said second low pass filter having a lower cut-off frequency than said third low pass filter, generating a desired exhaust gas recirculation flow based on an engine load, an engine speed, and atmospheric pressure, creating an error signal from a difference between said read exhaust gas recirculation flow and said desired exhaust gas recirculation flow, creating an actuation signal for the exhaust gas recirculation control valve based on said error, generating an adjusted actuation signal by adding a function of said filtered throttle position to said actuation signal, and sending said adjusted actuation signal to said vacuum regulator.

2. A method for controlling exhaust gas recirculation in an internal combustion engine having a throttle, an exhaust gas recirculation control system, said method comprising:
   sensing an exhaust gas recirculation flow;
   creating a first signal when the throttle is opening;
   creating a second signal when the throttle is closing;
   generating a desired exhaust gas recirculation flow based on an engine load, an engine speed, and atmospheric pressure;
   creating an error signal from a difference between said sensed exhaust gas recirculation flow and said desired exhaust gas recirculation flow;
   creating an actuation signal for the exhaust gas recirculation control valve based on said error; and
   generating an adjusted actuation signal by adding said first signal and said atmospheric pressure to said actuation signal when the throttle is opening and adding said second signal and said atmospheric pressure to said actuation signal when the throttle is closing.

3. The method recited in claim 2 wherein the exhaust gas recirculation system further includes an exhaust gas recirculation control valve, a tube coupled between an intake manifold and an exhaust manifold, and an orifice therebetween, wherein said step of sensing an exhaust gas recirculation flow further comprises the step of sensing a differential pressure across said orifice.

4. The method recited in claim 2 further comprising the step of representing said desired exhaust gas recirculation flow as a percentage of a total gas flow through the engine.

5. The method recited in claim 2 further comprising the step of representing said throttle position as a relative throttle position measured relative to a closed throttle position.

6. The method recited in claim 2 wherein said step of creating said first signal further comprises the step of sensing a throttle position and creating said first signal by filtering said sensed throttle position with a first low pass filter when the throttle is opening.

7. The method recited in claim 6 wherein said step of creating said second signal further comprises the step of sensing a throttle position and creating said second by filtering said sensed throttle position with a second low pass filter when the throttle is closing.

8. The method recited in claim 7 further comprising the step of setting said first low pass filter at a lower cut-off frequency than said second low pass filter.

9. An exhaust gas recirculation control system for an internal combustion engine having an intake manifold and exhaust manifold, the system comprising:
   a throttle located in the intake manifold of the engine;
   an exhaust gas recirculation tube coupled between the intake manifold and exhaust manifold of the engine;
   an exhaust gas recirculation control valve located in said tube;
   an orifice located in said tube upstream of said exhaust gas recirculation control valve;
   a differential pressure sensor for measuring a differential pressure across said orifice indicative of an exhaust gas recirculation flow; and
   an electronic engine controller for reading said differential pressure sensor, sensing a throttle position of the throttle, filtering said throttle position with a first low pass filter when said throttle position is opening and filtering said throttle position with a second low pass filter when said throttle position is closing, with said first low pass filter having a lower cut-off frequency than said second low pass filter, generating a desired exhaust gas recirculation flow based on an engine load, an engine speed, and atmospheric pressure, creating an error signal from a difference between said read exhaust gas recirculation flow and said desired exhaust gas recirculation flow, creating an actuation signal for the exhaust gas recirculation control valve based on said error, generating an adjusted actuation signal by adding a function of said filtered throttle position and said atmospheric pressure to said actuation signal, and sending said adjusted actuation signal to said exhaust gas recirculation control valve.

10. The system recited in claim 9 wherein said exhaust gas recirculation control valve is a pneumatically actuated valve.

11. The system recited in claim 10 wherein said pneumatic exhaust gas recirculation control valve further comprises an electronically controlled vacuum regulator for controlling a valve position of said pneumatic exhaust gas recirculation control valve.

12. The system recited in claim 11 wherein said electronically controlled vacuum regulator converts an electrical signal into a control vacuum.

13. The system recited in claim 9 wherein said controller filters said read differential pressure sensor with a third low pass filter.

* * * * *